Sept. 12, 1967 D. G. BASTIAN 3,340,987

REPEAT-CHARACTER-DELAY CODE TRANSLATOR

Filed Sept. 26, 1966 12 Sheets-Sheet 1

INVENTOR.
DONALD G. BASTIAN

BY John A. Harvey

ATTORNEY

Sept. 12, 1967 D. G. BASTIAN 3,340,987

REPEAT-CHARACTER-DELAY CODE TRANSLATOR

Filed Sept. 26, 1966 12 Sheets-Sheet 2

Sept. 12, 1967 D. G. BASTIAN 3,340,987

REPEAT-CHARACTER-DELAY CODE TRANSLATOR

Filed Sept. 26, 1966 12 Sheets-Sheet 4

Sept. 12, 1967 D. G. BASTIAN 3,340,987

REPEAT-CHARACTER-DELAY CODE TRANSLATOR

Filed Sept. 26, 1966 12 Sheets-Sheet 6

CODE # 1
NO SEL-TO-NEW CODE SELECTION

CODE # 2
SAME AS CODE # 1

CODE # 3
DIFFERENT FROM CODE # 2

CODE # 4
SAME AS CODE # 3

United States Patent Office 3,340,987

Patented Sept. 12, 1967

3,340,987
REPEAT-CHARACTER-DELAY CODE TRANSLATOR

Donald G. Bastian, Rochester, N.Y., assignor to Friden, Inc., a corporation of Delaware Filed Sept. 26, 1966, Ser. No. 582,134
14 Claims. (Cl. 197—20)

ABSTRACT OF THE DISCLOSURE

A code translator suitable for automatic control of power operated typewriters performs a continuing comparison of coded data characters successively presented for reproduction. The translator uses this comparison to permit reproduction of non-repetitive characters at reproduction rates higher than is permissible for reproduction of successively repeated characters and automatically temporarily reduces the reproduction rate to that permissible for reproducing any two or more such successively repeated characters. The translator includes permutation members which upon each presentation of a coded character for reproduction, are set to one of two positions according to the presence and absence of a corresponding individual one of plural permutational code bits individually representative of the coded character presented. Each permutation member includes a "memory" member which is similarly set to one of two positions but with delayed setting control in relation to each new setting of the permutation members, the setting and delayed setting control being such that each "memory" member remembers and identifies for each new setting of the permutation members the position to which its associated permutation member was set during the preceding setting of the permutation members. After each new setting of the permutation members is completed, the prevailing settings of all of the "memory" members are concurrently tested to ascertain whether the new setting of the permutation members is identical to their preceding setting (repeat character settings) or differs from the preceding setting (non-repeat character settings) and the result of such test is then available to enable character-by-character control of the rate at which successively presented characters are reproduced by the typewriter.

The present invention relates to code translators, and particularly to code translators suitable for use in power operated typewriters for automatic print reproduction of data and functional control information supplied in coded form by an information source such as a punched tape or tabulating card reader or an electronic computer. In greater particularity, the invention concerns a repeat-character-delay code translator for enabling operation of the typewriter at a high information print reproduction rate while temporarily reducing the operating rate whenever print reproduction of repetitive characters is required.

The typed reproduction of alpha-numeric and symbol character information items, and the use of functional control information items, derived by a suitable information reader is often desirable and finds widespread application. Typical examples of power operated typewriter structures including a code converter and a punched tape or punched tabulating card reader constructed as integral units of the typewriter are disclosed in the U.S. Patent No. 2,700,447, granted Jan. 25, 1955, to Edwin O. Blodgett and U.S. Patent No. 2,905,298, granted Oct. 22, 1959, to Edwin O. Blodgett and Wilbur C. Ahrns. The maximum operating rate of print reproduction has heretofore been limited in such automatically controlled typewriters by the operating rate of the typewriter printing mechanism, and particularly by the maximum cyclic rate at which any given type bar may be moved from a position of rest to a type impression position and be then returned to its position of rest. The frequent necessity to reproduce repetitively occurring alpha-numeric and symbol characters has heretofore limited the maximum type reproduction rate of the typewriter to that at which a single type bar can be operated in repetitive type-reproduction manner. Were it not for such type bar repeat-character operational limitation, the reproduction rate of the typewriter could be substantially increased and would then only be limited by the possible overlapping of two adjacent type bars moving simultaneously.

It is an object of the present invention to provide a new and improved repeat-character-delay code translator having a relatively high cyclic operating rate in the absence of successive identical repeat codes supplied thereto yet having an automatic reduction of its operating rate beginning with the second successive identical repeat code and continuing for all successive such repeat codes.

It is a further object of the invention to provide a novel repeat-character-delay code translator having particular utility for incorporation in power driven typewriters for automatic print-reproduction control thereof, and one which enables a desirably higher typewriter-reproduction rate than heretofore readily obtainable yet enables automatic reduction of the print-reproduction rate for satisfactory print reproduction of any two or more repetitive alpha-numeric or symbol characters.

It is an additional object of the invention to provide an improved repeat-character-delay code translator of sturdy construction providing high reliable and error-free operation at relatively high operating rates and over prolonged operational periods, and one requiring minimized service attention and maintenance.

Other objects and advantages of the invention will appear as the detailed description thereof proceeds in the light of the drawings forming a part of this application and in which:

FIGS. 1*a*–1*b* arranged as in FIG. 1 illustrate in side elevational view a code translator structure embodying the present invention;

Figure 8:
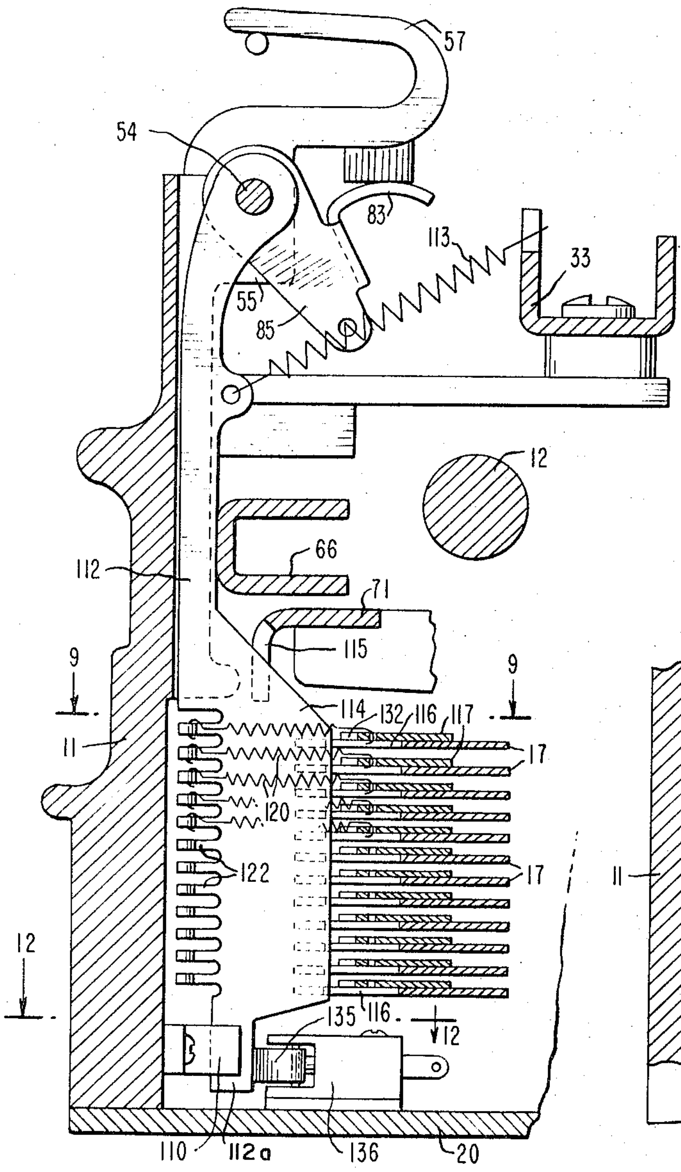
FIG. 8 is an elevational cross-sectional view taken along the plane 8—8 of FIG. 1*b* and illustrates a repeat-character-delay structure incorporated in a code translator embodying the present invention.
Figure 12:
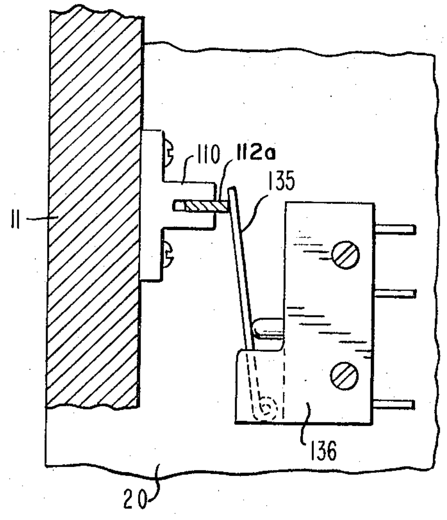
Figure 9:
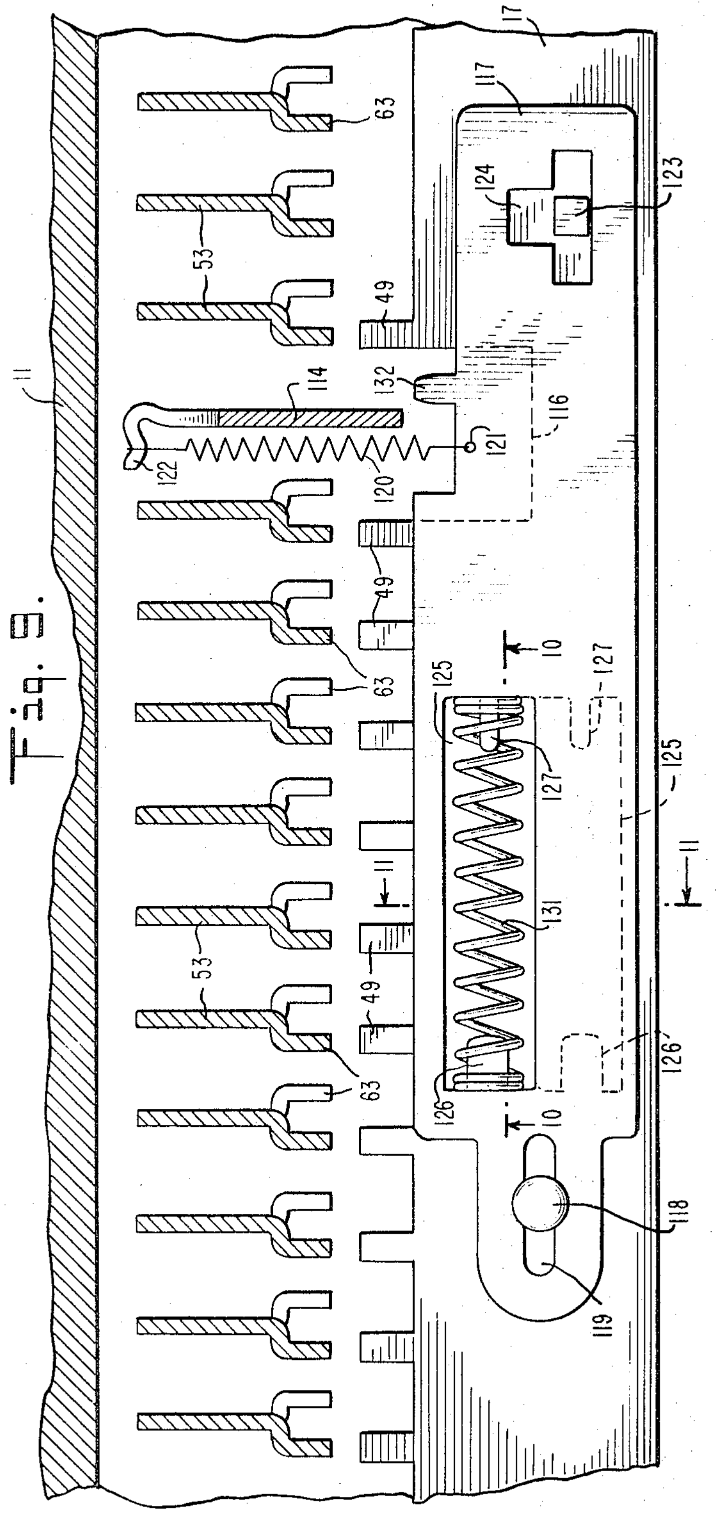
Figure 11:
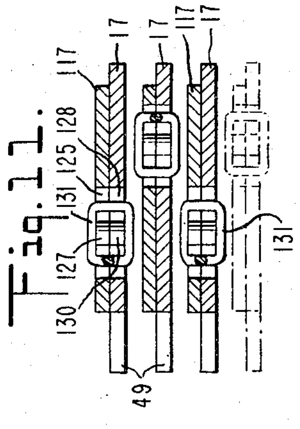
Figure 10:
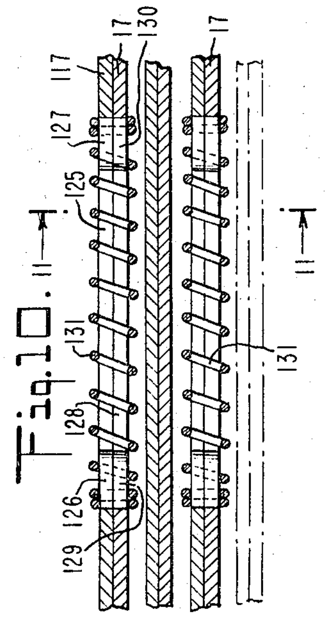
Figure 13A:
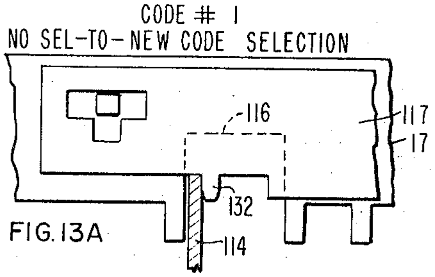
Figure 14A:
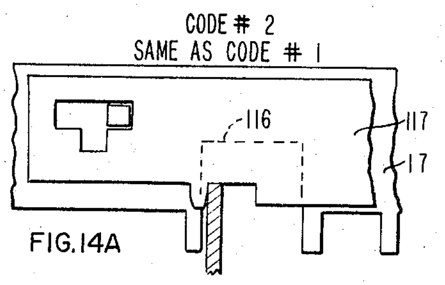
Figure 13B:
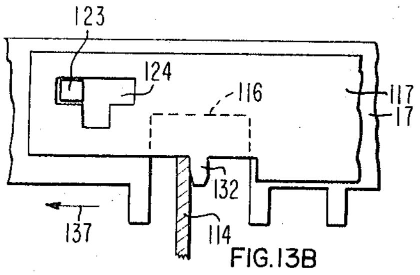
Figure 14B:
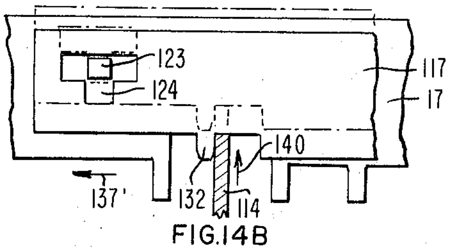
Figure 13C:
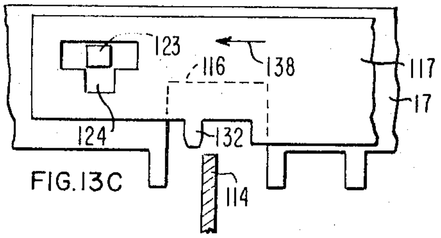
Figure 14C:
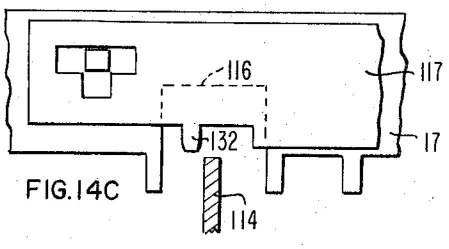
Figure 13D:
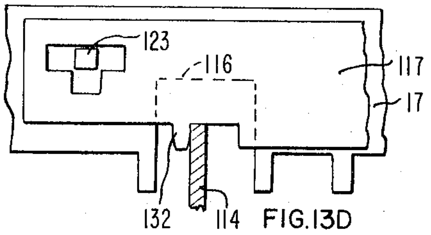
Figure 14D:
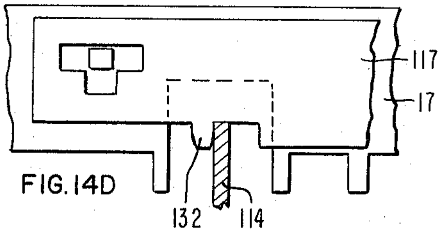
Figure 13E:
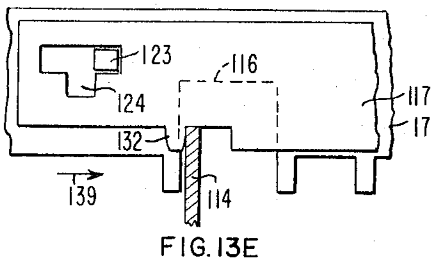
Figure 14E:
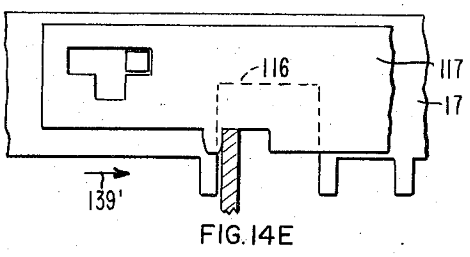
Figure 15A:
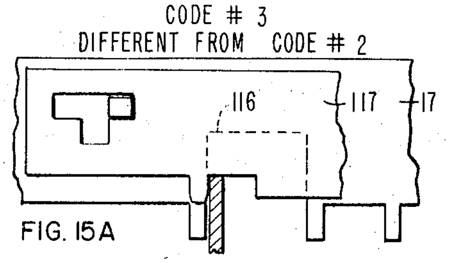
Figure 15B:
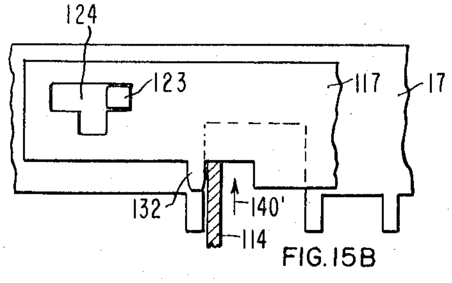
Figure 15C:
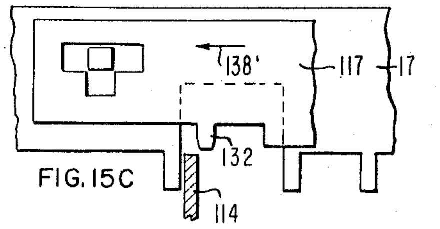
Figure 15D:
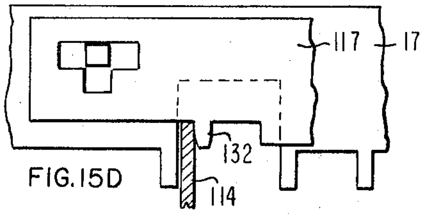
Figure 15E:
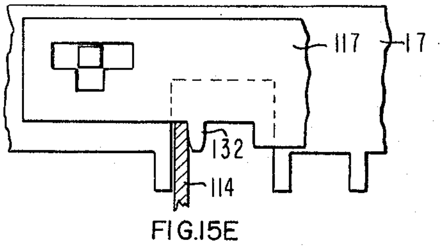
Figure 16A:
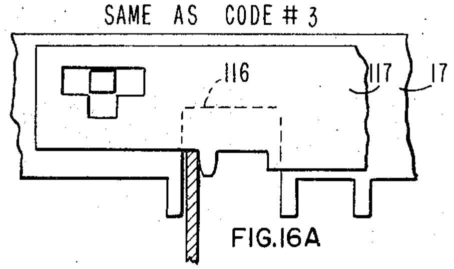
Figure 16B:
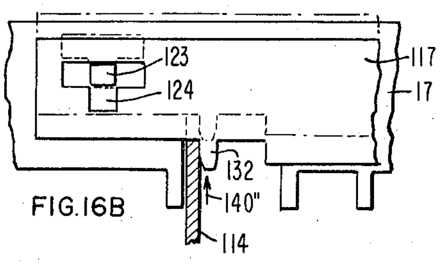
Figure 16C:
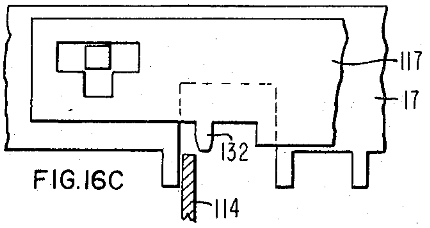
Figure 16D:
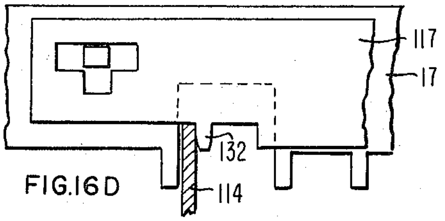
Figure 16E:
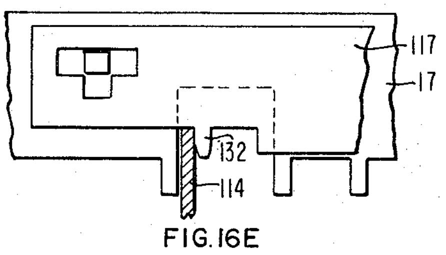
Figure 17:
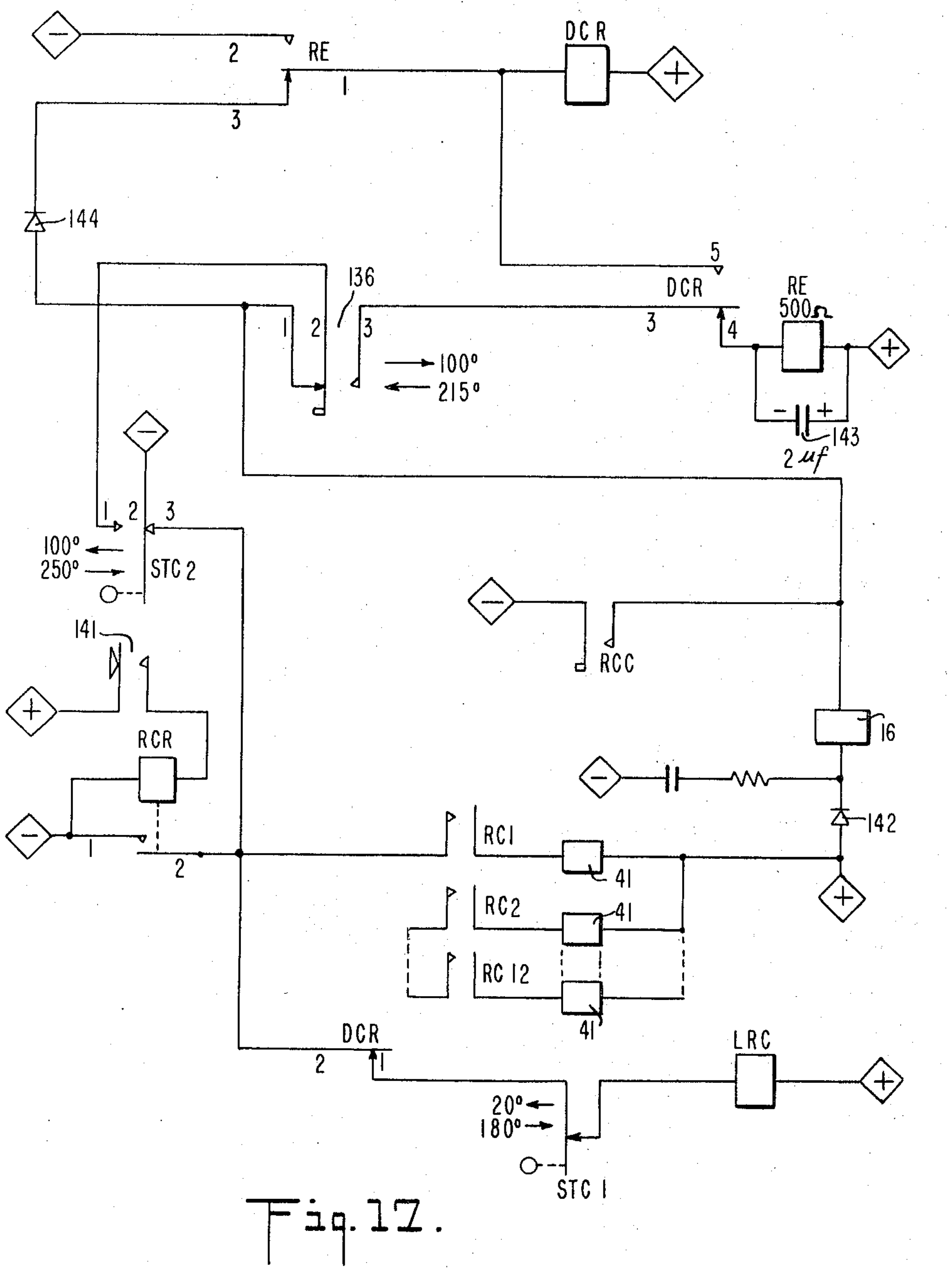

FIG. 9 is a fragmentary plan cross-sectional view taken along the plane 9—9 of FIG. 8, FIG. 10 is a fragmentary elevational view taken along the plane 10—10 of FIG. 9, FIG. 11 is a fragmentary elevational view taken along the plane 11—11 of FIG. 9, and FIG. 12 is a fragmentary cross-sectional plan view taken along the plane 12—12 of FIG. 8, all illustrating certain details of construction of the repeat-character-delay structure embodied in the present code translator;

FIGS. 13–16 are fragmentary plan views more particularly described hereinafter and are used as an aid in explaining the operation of the invention; and FIG. 17 is an electrical circuit diagram showing a representative control electrical circuit for control of the code translator of the present invention and intercontrol of the translator and an associated source of data information more particularly described hereinafter.

Figure 1A:
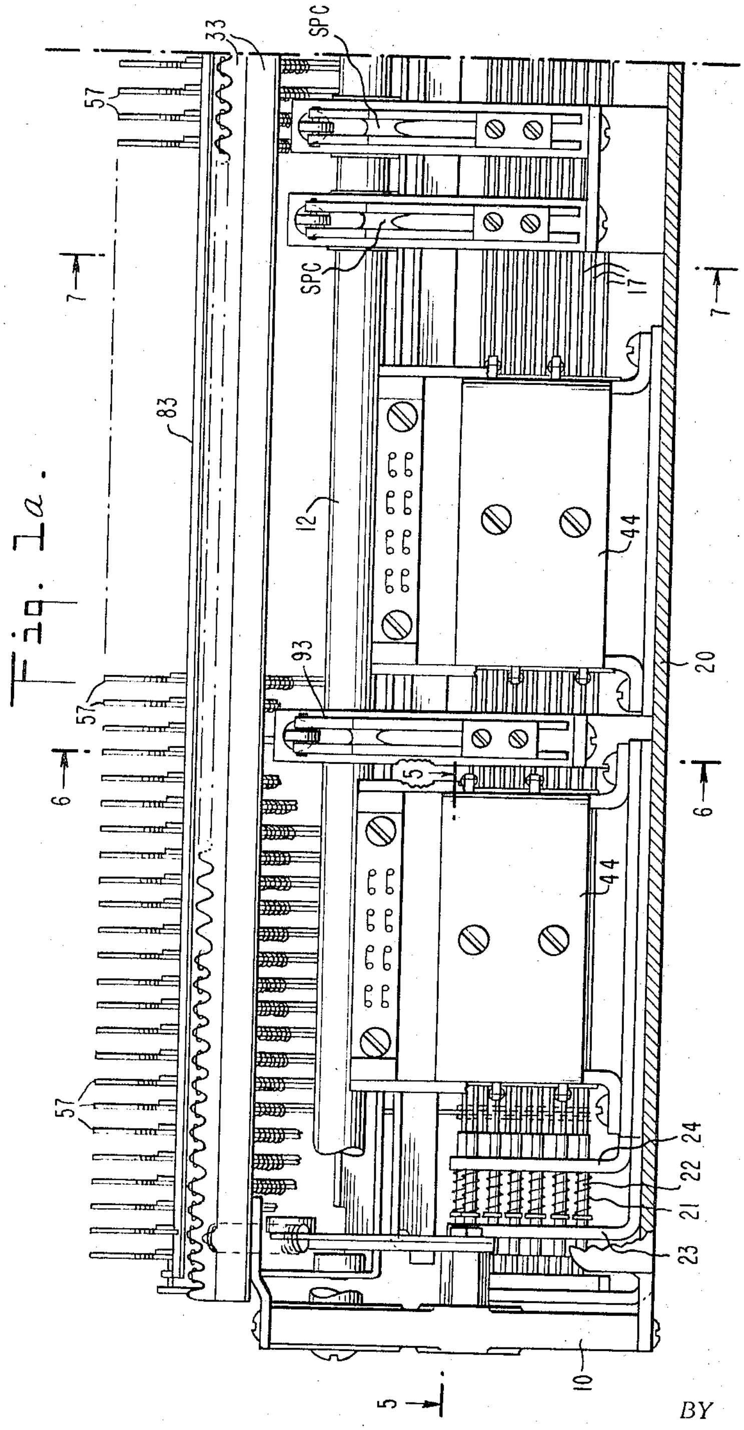
Figure 1:
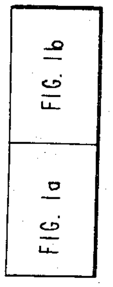
Figures 1B, 4:
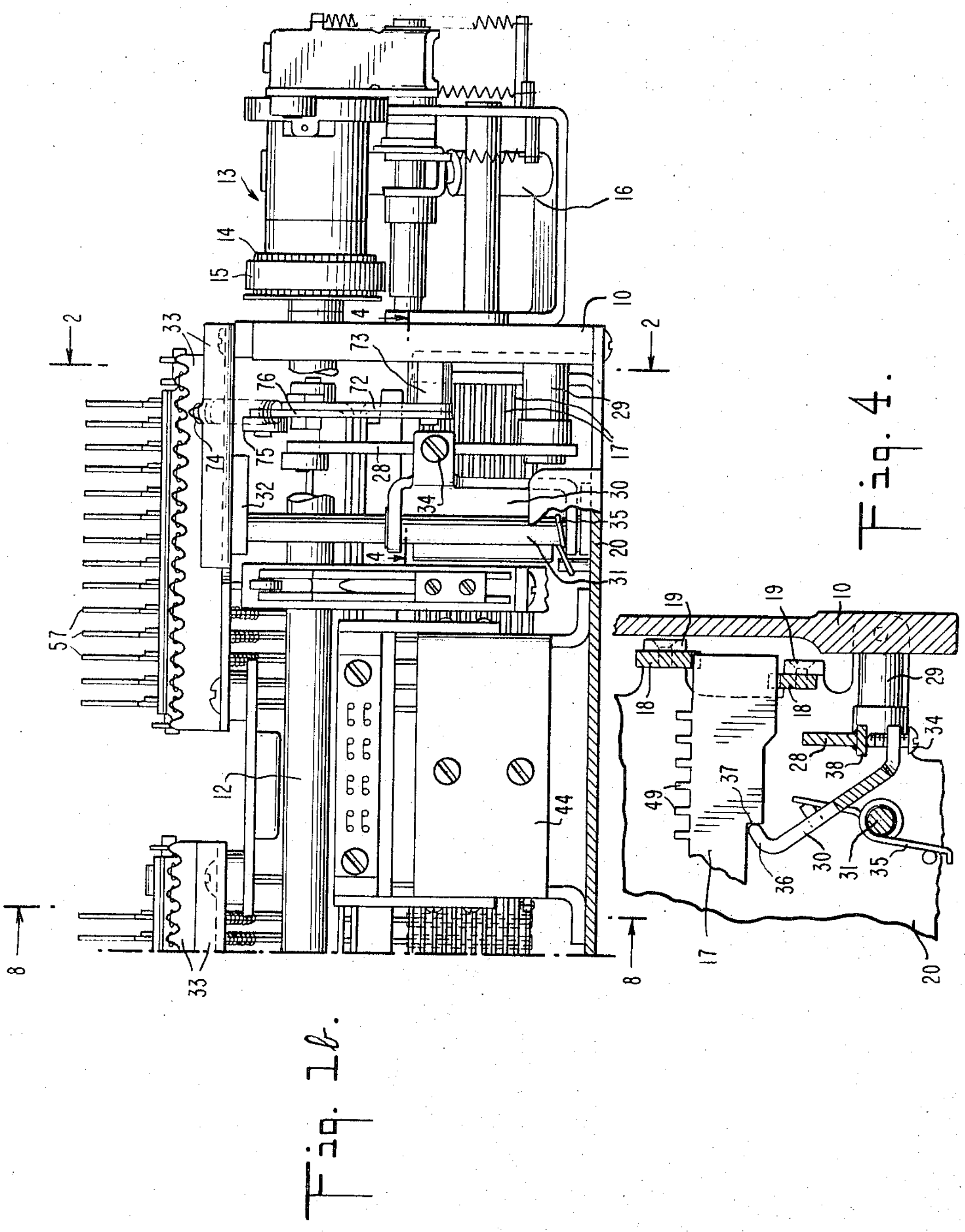
FIG. 4 is a fragmentary cross-sectional plan view taken along the plane 4—4 of FIG. 1*b* and illustrates a portion of the permutation slide reset structure of the translator.
Figure 2:
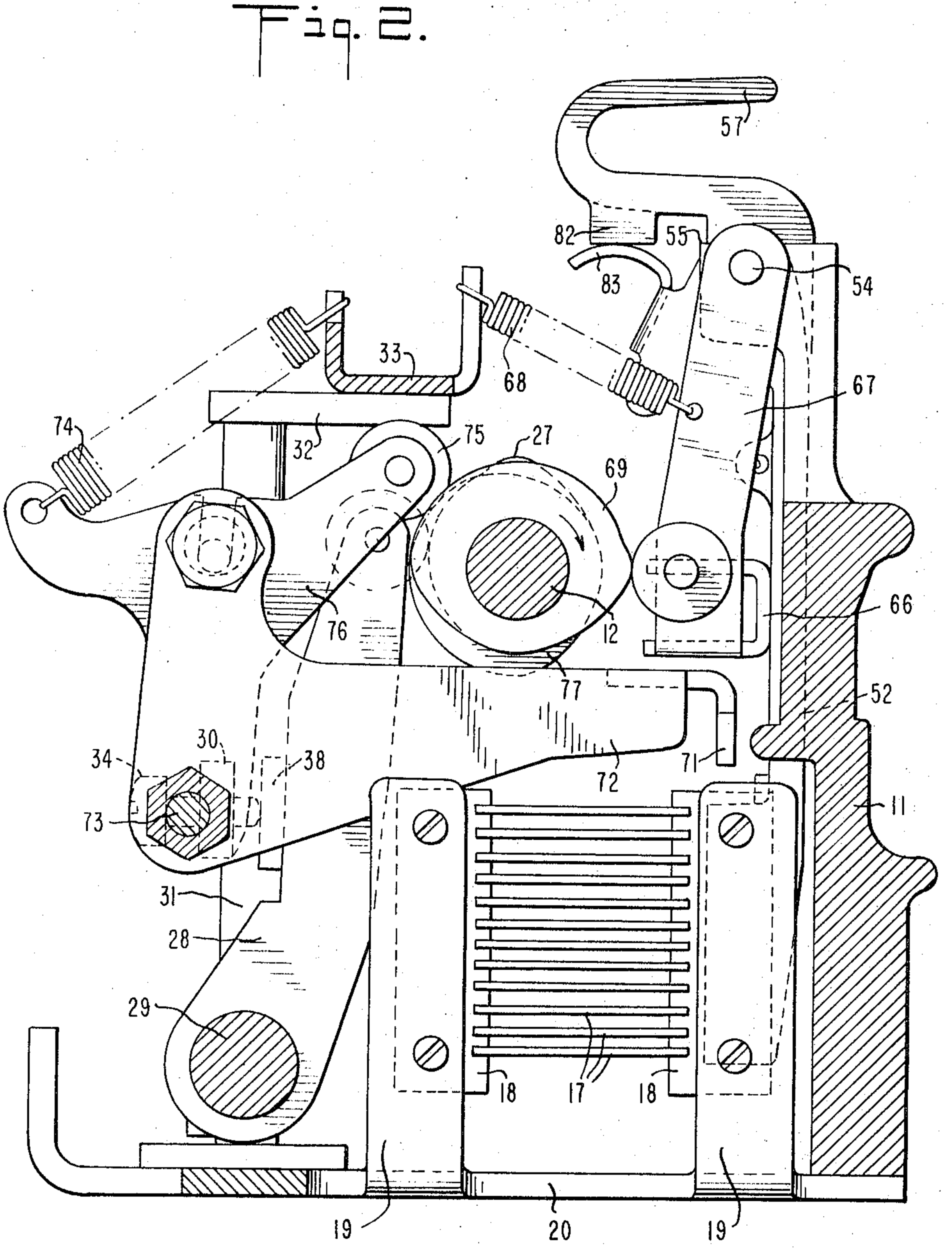
FIG. 2 illustrates in end elevational cross-sectional view, taken along the plane 2—2 of FIG. 1*b*, certain drive structures incorporated in the code translator.

Referring now more particularly to the side elevational view illustrated in FIGS. 1*a* and 1*b* arranged as in FIG. 1 and to the cross-sectional end view of FIG. 2 of the drawings, the code translator of the present invention is fabricated within a sturdy cast frame of U-shaped configuration having end walls 10 joined by an integral front wall 11. The translator includes a driven shaft 12 rotatably supported by suitable bearing structures, not shown, in the end walls 10 and power driven by a translator cycle control clutch 13 positioned on the end of the shaft 12 as illustrated in FIG. 16 and supported upon the adjacent end wall 10. The cycle control clutch 13 is conveniently one of the helical wire spring type having the construction generally illustrated in FIGS. 4, 6 and 7 of the U.S. Patent No. 2,927,158, granted Mar. 1, 1960, to Edwin O. Blodgett. Thus as in the Blodgett clutch, the present clutch 13 includes a pulley 14 for power drive by a belt 15 from the power drive structure (not shown) of the typewriter in which the code translator is incorporated. Whereas the Blodgett clutch is of the partial revolution type having stop detent protuberances physically positioned with 180° spacings by which to halt the driven shaft at its 0° and 180° cyclic positions, the control clutch 13 of the present translator is provided with a first stop protuberance establishing the 0° or home cyclic halt position of the translator and is provided with a second stop protuberance physically spaced by 140° for halt of the translator at its 140° cyclic position. As in the Blodgett patent, control of the clutch 13 to release the translator from each of its 0° and 140° cyclic positions is effected by electrical energization of a clutch control electromagnet 16.

The translator includes a plurality of code permutation slides 17 which, as more clearly shown in FIG. 2, are supported in stacked relation and guided for reciprocal longitudinal motion by grooved guide members 18 secured to upstanding brackets 19 integrally formed at the ends of a baseplate 20 secured between and on the bottom side of the end walls 10. The permutation slides 17 are biased to an unlatched or operated position by individual helical wire springs 21 encircling headed bias pins 22 which are reciprocally supported in guide apertures of upstanding brackets 23 and 24 secured to the baseplate 20. All slides in the operated position are concurrently reset to and latched in a non-operated position near the end of each translator cycle. As illustrated more clearly by the end view of FIG. 2, by the isometric view of FIG. 3, and by the fragmentary view of FIG. 4, this concurrent reset of all of the permutation slides 17 is accomplished by a reset cam 27 supported on the driven shaft 12. This cam engages a cam follower arm 28 which is pivoted on a stud shaft 29 of the adjacent end wall 10 and engages a reset bell crank 30 pivotally supported on a shaft 31 secured between the baseplate 20 and a projecting support plate 32 secured to a U-shaped frame 33 extending between and affixed to the top edge portions of the end walls 10. An adjusting screw 34 is threaded through one arm of the bell crank 30 for engagement with a small plate 38 secured normal to the edge of the cam follower arm 28 to allow adjustment of the reset angular position of the bell crank 30 with respect the reset position of the follower arm 28, the bell crank 30 being biased by a wire spring 35 to maintain continuous engagement between the adjusting screw 34 and the plate 38 of the follower arm 28. The remote end of the bell crank 30 is provided with a hooked end 36 as more clearly shown in FIG. 3, and during the reset operation the hooked end 36 concurrently engages a notch 37 provided in each permutation slide 17 to reset all operated ones of the slides to their nonoperated latched position after which the hooked end 36 is withdrawn sufficiently far from engagement with the slide notches as to permit subsequent movement of the slides to operated position. This reset operation begins at approximately 268° and is completed at approximately 352° of each translator cycle.

Figure 3:
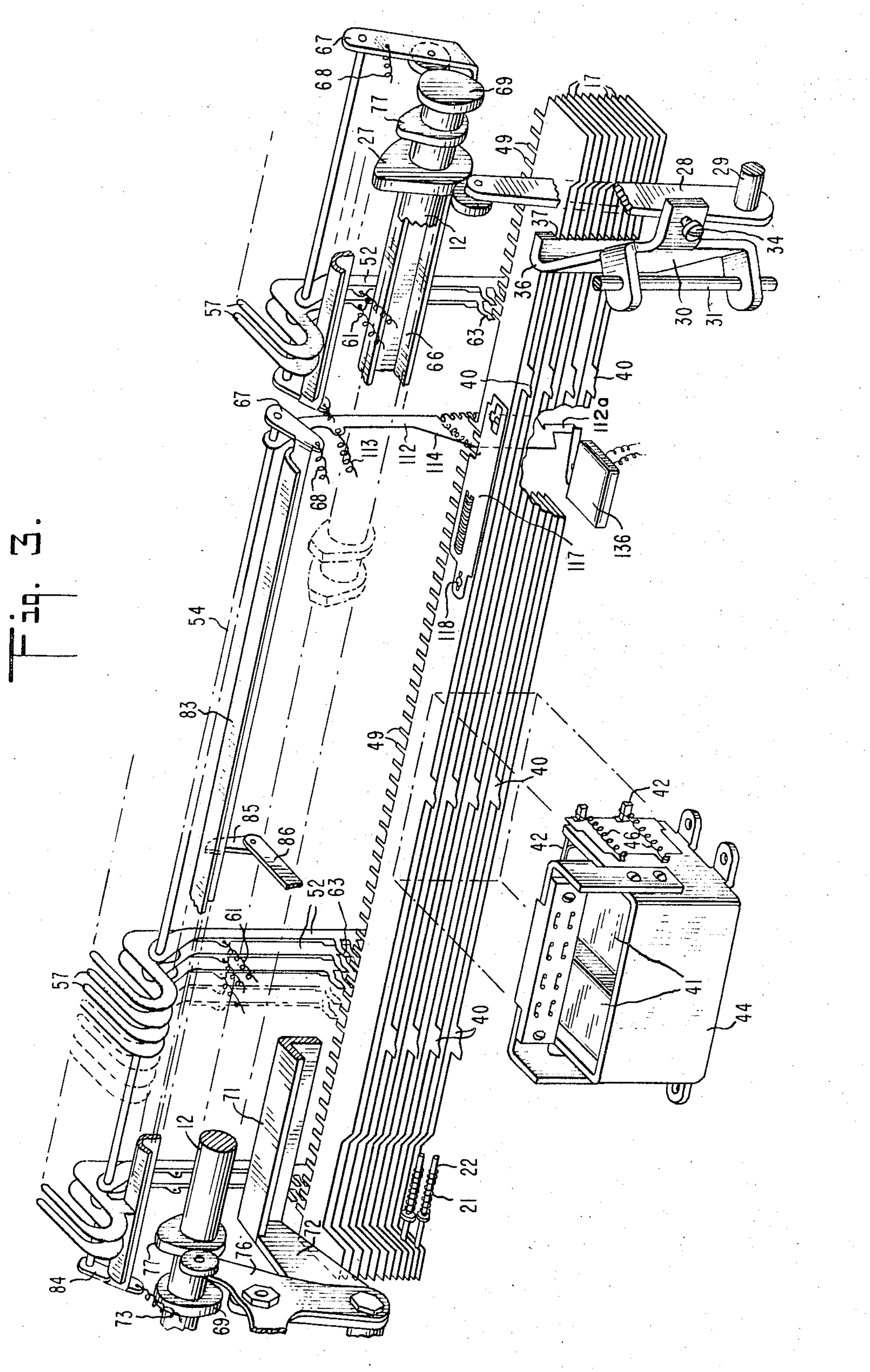
FIG. 3 illustrates in isometric view the general construction of a code translator embodying the present invention.
Figure 5:
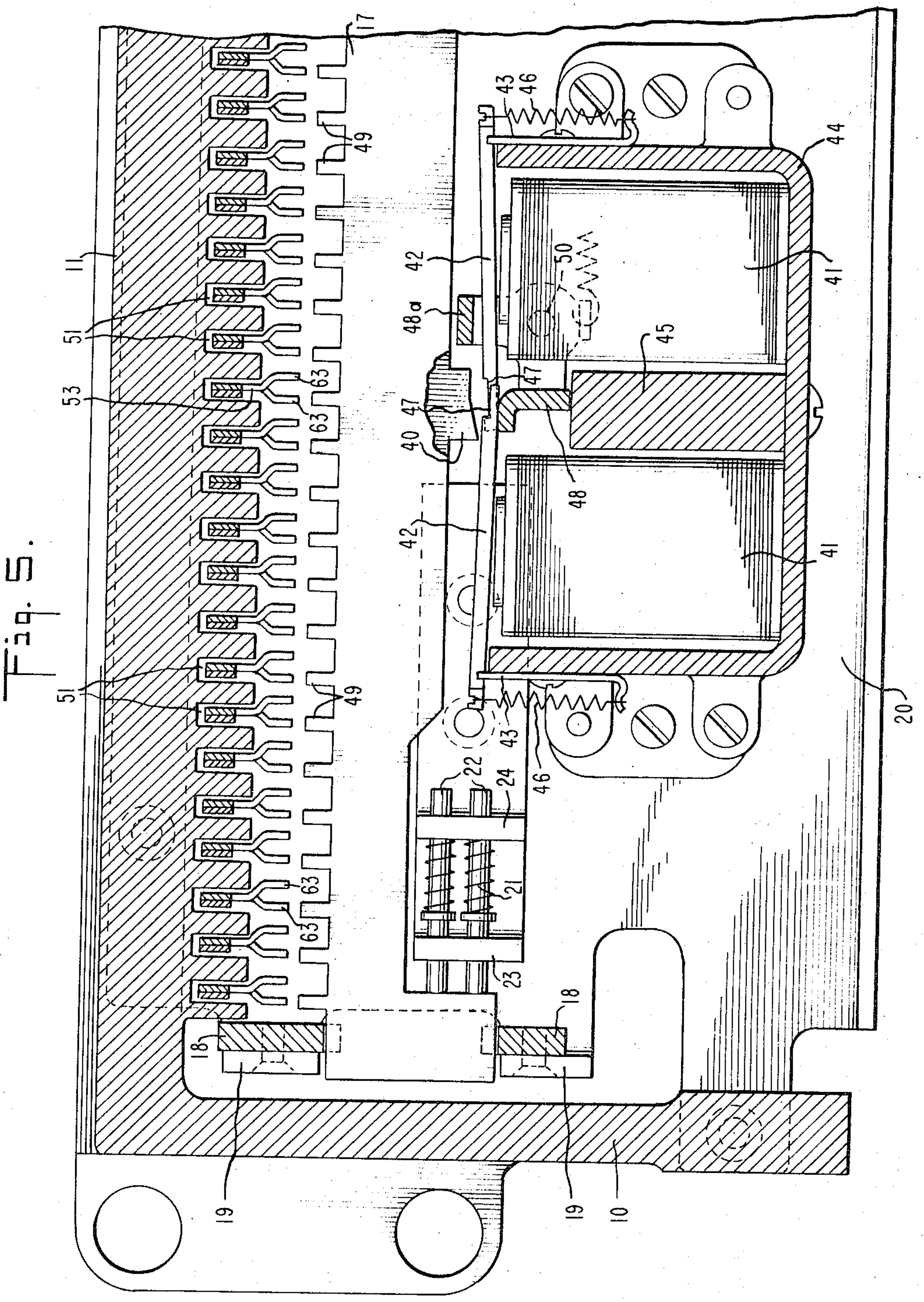
FIG. 5 is a partial cross-sectional plan view taken along the plane 5—5 of FIG. 1*a* and illustrates a permutation slide latch structure together with the cooperative relation of the permutation slides with seeker structures employed in the code translator.

The permutation slides 17 are each provided with an edge latch protuberance 40 positioned longitudinally along the slide for arrangement in longitudinally positioned groups as more particularly shown in FIG. 3 and, as illustrated in FIG. 5, there is associated with each such latch protuberance group a corresponding group of code selective electromagnets 41 for latching the slides 17 in their reset position. The several groups of electromagnets are supported in spaced relation on the baseplate 20 as illustrated in FIG. 1, and there is one electromagnet 41 provided for each permutation slide 17. The electromagnets 41 have movable armatures 42 of finite width, and it is to allow for this that the latch protuberance 40 of every fourth slide is longitudinally positioned in a latch protuberance group associated with a given group of electromagnets 41. As illustrated in FIG. 5, each electromagnet armature 42 is pivoted on a knife-edge member 43 secured to a U-shaped magnetic pole frame member 44 which supports the electromagnets 41 as a group thereof and to which a centrally positioned elongated magnetic pole structure 45 is secured. The armature 42 of each electromagnet is biased by a tension spring 46 to pivot a latch notch 47, provided at the free end of each armature as shown, into latching engagement with the latch protuberance 40 of an individual permutation slide 17. This latched engagement maintains each such slide in its reset position until it is latch released to operated position by energization of the associated electromagnet 41 to move the associated armature 42 to attracted position.

A U-shaped armature knock-off bail 48 is pivotally supported at 50 for pivotal motion in clockwise direction, as seen in FIG. 5, by engagement between the bail arm 48*a* and the latch protuberance 40 of any slide which is moved to the slide reset position. The bail 48 is common to each group of electromagnets 41, and the bail movement pivots all of the armatures 42 of the group away from their attracted position and into latching engagement with an associated protuberance 40 principally to insure that the armatures are not retained in attracted position by any residual magnetism of the associated electromagnet pole structure. The electromagnets 41 are energized in permutational combinations near the outset of each translator cycle of operation, and in accordance with a permutational code used to control the translator operation during such cycle, thus to provide a corresponding permutational positioning of the permutation slides 17 by retaining one or more such slides in their latched or nonoperated position and by unlatching one or more others of the slides to their operated position under bias force of their individual bias springs 21.

As illustrated more clearly in FIGS. 3 and 5, the permutational slides 17 are identically notched along one edge to provide a plurality of equally spaced code selective projections 49. In the reset position or non-operated position of the slides 17, the projections 49 of one slide are aligned with those of the adjacent slide. In the unlatched or operated position of a permutation slide 17, however, its projections 49 are positioned midway between the projections 49 of a non-operated or latched slide.

Figure 6:
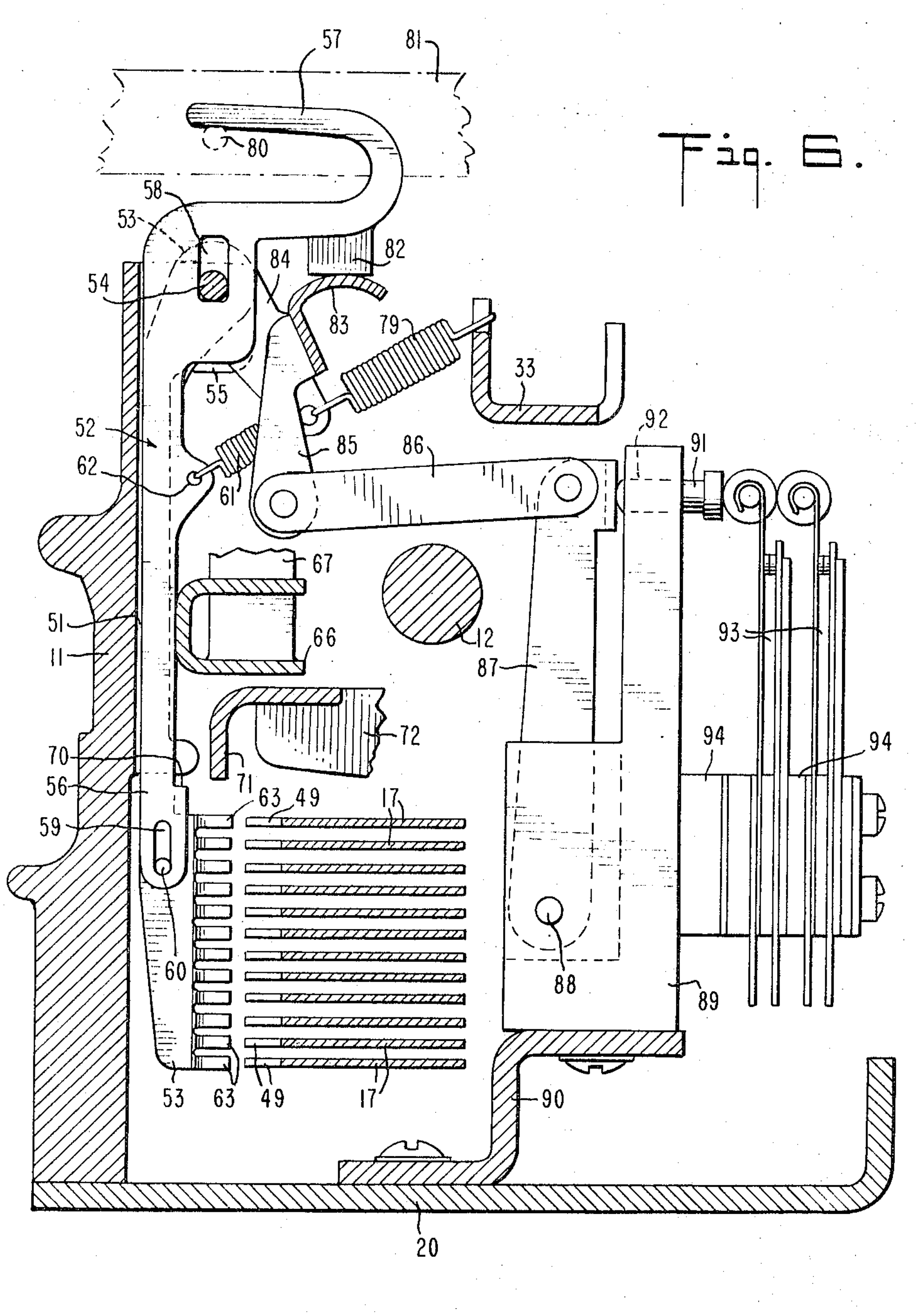
FIG. 6 is a cross-sectional elevational view taken along the plane 6—6 of FIG. 1*a* to illustrate an electrical contact actuating structure of the code translator.
Figure 7:
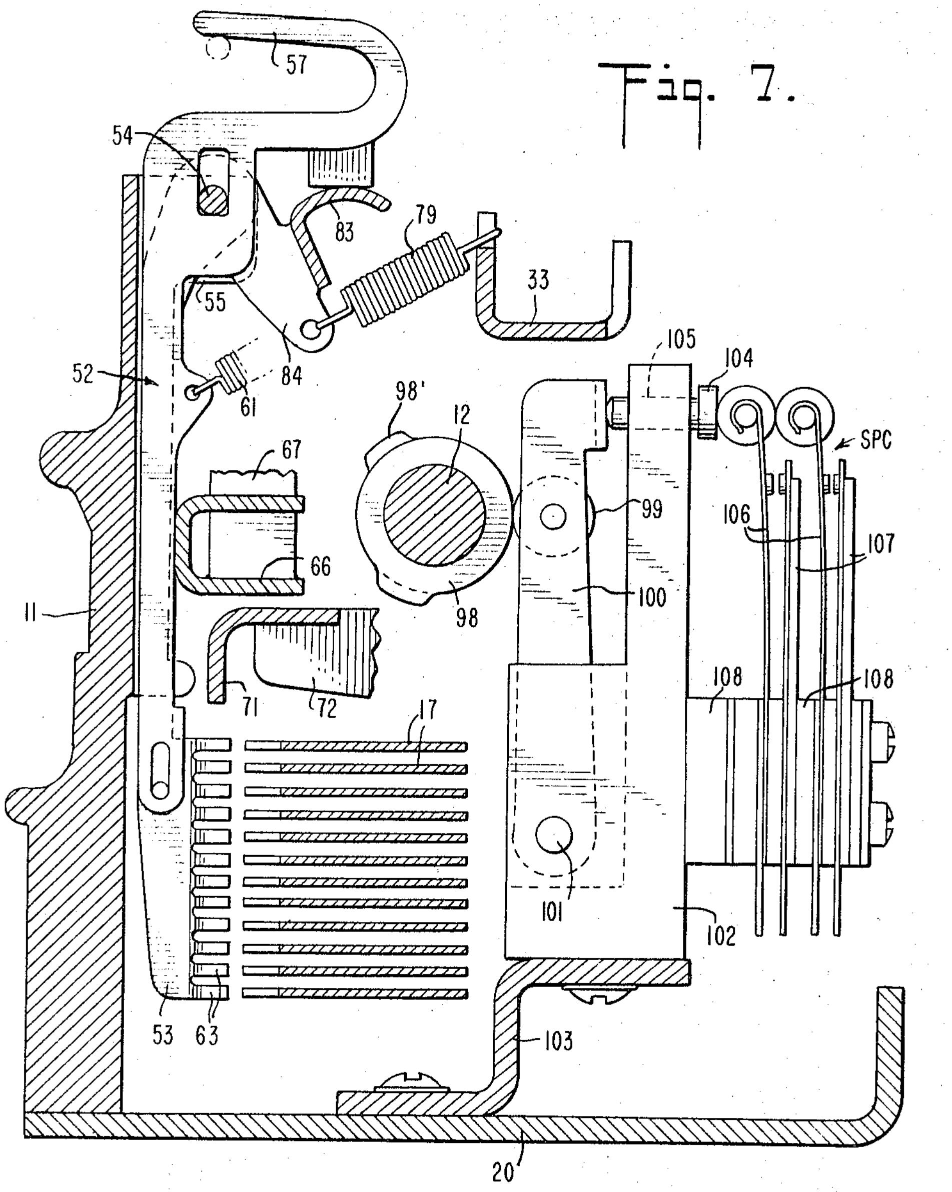
FIG. 7 is an elevational cross-sectional view taken along the plane 7—7 of FIG. 1*a* and illustrates a second electrical contact actuating structure of the code translator.

The code translator includes a plurality of seeker structures 52 movably positioned to be guided by slots 51 of the front wall 11 and each comprised, as illustrated in FIG. 6, by a first seeker member 53 pivotally supported on a rod 54 supported between rearwardly extending projections 55 integral with and spaced along the top of the translator front wall 11. The seeker structures 52 include a second seeker member 56 having a hooked upper end portion 57, an upper longitudinally extending guide slot 58 through which the support rod 54 extends, and a lower longitudinally extending guide slot 59 by which the seeker member 56 is secured by a pin 60 to the seeker member 53 while permitting longitudinal movement of the seeker member 56 relative to the seeker member 53. Each seeker member 56 is biased by a tension spring 61, having one end hooked in an aperture 62 and its opposite end hooked over an individual projection formed by serrating the front upper edge of the U-shaped frame member 33, to a non-operated uppermost position where the shaft 54 engages the end of the guide slot 58. The pivoted seeker member 53 is provided along its lower edge with a plurality of tines 63, there being one such tine provided for each of the permutation slides 17 and the tines occupying one of two laterally offset positions as shown in FIG. 5. In particular, the laterally offset positions for the tines 63 of each seeker structure 52 are so selected in relation to the permutational settings of the permutation slides 17 to their latched or non-operated and unlatched or operated positions that for each possible such permutational setting of the slides 17 the tines 63 of only one seeker structure 52 will not engage the end of any projection 49 on any permutational slide whereas the tines 63 of all other seeker structures 52 will engage at least one of the projections 49 of the permutational slides.

Beginning at approximately 60° of the translator cycle, the seeker structures 52 are permitted to move to their seeker test positions with respect the projections 49 of the permutation slides 17 by the bias force exerted by their individual tension springs 61 upon pivotal motion toward the driven shaft 12 of a test bail 66 supported at its ends by cam follower arms 67 pivotally supported on the support rod 54 and biased by a spring 68 into engagement with an actuating cam 69 on the driven shaft 12. One seeker structure 52 will have its tines 63 laterally so positioned as not to engage any projection 49 of any of the permutationally set permutation slides 17, and this selected seeker pivots sufficiently far that a notch shoulder 70 provided on the seeker member 56 moves below an operating bail 71. The latter is supported on end bell crank arms 72 which are pivoted on stud shafts 73 (FIGS. 1 and 2) on the end walls 10 and are biased by tension springs 74 to engage a cam follower roller 75, pivotally supported on a second bell crank arm 76, into engagement with a cam 77 secured to the driven shaft 12. Beginning at approximately 140° of the translator cycle, the cam drive structure just described moves the operating bail 71 downwardly to engage the seeker notch shoulder 70 of the selected seeker structure 52, moved to seeker operating position as just described, and continued downward movement of the operating bail 71 moves the seeeker member 56 downwardly. The hooked end portion 57 of this seeker member engages a pin 80 secured to the side of a typewriter key lever 81, shown in broken lines, to perform a typewriter print or functional control operation. Beginning at about 178° of the translator cycle, and before restoration of the operating bail 71 to its non-operated position near the end of the translator cycle, the test bail 66 is moved counterclockwise as seen in FIG. 6 to release the seeker notch shoulder 70 of the selected seeker structure out of engagement with the operating bail 71 and to move the tines 63 of all seeker structures out of engagement with the projections 49 of the permutation slides 17. This reset motion of the seeker structures 52 is completed at approximately 268° of the translator cycle prior to initiation of the movement of the permutation slides 17 toward their reset or non-operated position.

Each time any seeker structure 52 is selected by a permutational setting of the permutational slides 17 and is operated to a seeker output actuation position at which its hooked end portion 57 is drawn downwardly by movement of the operating bail 71 in the manner just described, there are applications where it is desirable to indicate this fact by operation of electrical control contacts. To this end, and as illustrated in FIG. 6, the hooked end portion 57 of each seeker structure includes a depending heel portion 82 which upon operation of the seeker hooked end portion to its seeker output actuation position engages a bail 83 pivotally supported by end arms 84 on the support rod 54. The bail 83, biased by a spring 79 into engaging relation with the heel portion 82, has a depending arm 85 which is connected by a link member 86 to an electrical contact actuating arm 87 pivoted at 88 on a base member 89 supported by a bracket 90 from the translator baseplate 20. Pivotal motion of the actuating arm 87 with pivotal movement of the bail 83 is transmitted through a pin 91 reciprocally supported by an aperture 92 of the base member 89 to operate one or more pairs of electrical contacts 93, supported by insulating members 94 on the base member 89 as shown, to their open contact positions. The contacts 93, by interruption of the electrical continuity of one or more electrical control circuits, may thus provide indicative control by reason of the seeker structure selection and operation.

The code translator and its associated cyclically operating coded-data supply source, such as a punched tape reader, are so electrically intercontrolled that the source upon progressing through an initial preselected portion of its operating cycle initiates a cycle of translator operation and the translator upon progressing through a preselected portion of its cycle initiates a further cycle of operation of the source. This intercontrol of the related cyclic operations of the code translator and data source is particularly significant for the delayed mode of translator repeat-character operation hereinafter considered. It is conveniently accomplished electrically by use of cyclically-operated cam-actuated electrical contacts in both the translator and source by which to control the energizations of translator and source cycle-initiating clutch magnets in a manner more particularly to be described hereinafter. To this end, and referring to FIG. 7, there are affixed to the driven shaft 12 a plurality of cams 98, 98', etc. each of which operates an individual set of electrical contacts by means of an individual but similar actuating structure next to be considered for the cam 98. The latter is engaged by a cam follower roller 99 rotationally supported upon a follower arm 100 pivotally supported at 101 on a base member 102 in turn supported by a bracket 103 from the translator baseplate 20. The cam roller 99 is biased into engagement with the cam 98 by a bias force exerted through an actuating pin 104, reciprocally supported and guided by an aperture 105 in the base member 102, from the spring leaf contact members 106 of an electrical contact set SPC having stationary contacts 107 and being supported by insulating member 108 upon the base member 102 as shown. Thus over a preselected cyclic range of rotational motion of the driven shaft 12, defining a corresponding portion of a cycle of operation of the code translator, the cam 98 through the cam follower 99 and 100 actuates the contacts of the contact set SPC to closed-contact position thereby to provide interrelated cyclic control of the associated data source in a manner presently to be explained.

It was explained above that a code translator embodying the present invention normally has a relatively high cyclic operating rate in the absence of successive identical repeat-code permutational energizations of its code electro-magnets 41, but is controlled automatically to reduce its operating rate beginning with the second of any two or more successive repeat codes. This reduction of operating rate correspondingly reduces the print-reproduction rate of the associated typewriter as required to permit two or more print reproductions of repeated alpha-numeric and symbol characters. The test for successive repeat codes is accomplished in the present code translator by a structure illustrated in FIGS. 8–12, and includes a repeat-test bail member 112 which is pivotally supported on the support rod 54 and is biased by a tension spring 113 to engage the seeker test bail 66 for concurrent movement with the seeker structures 52 to and from their test position. The repeat-test bail member 112 includes a projecting bail test portion 114 conveniently extending through a slot 115 of the operating bail 71, which thus does not operate the repeat-test member 112, and is received in relatively deep slots 116 provided in the notched edge of the permutation slides 17 at the region of the repeat-test bail portion 114. The reduced lower end portion 112*a* of the repeat-test bail member 112 is guided for angular motion of this member by a slotted guide member 110 secured to the front wall 11 of the translator structure.

As illustrated more clearly in FIGS. 9–11, each of the permutation slides 17 is provided with a past-position identifying slide member 117 which operates to identify the permutational positioning of the slide during the preceding translator cycle. Each member 117 is pivotally and reciprocally secured to the associated permutation slide 17 by a headed pin 118 which extends through a longitudinal slot 119 of the member 117 and is secured to the slide 17. Each of the members 117 is biased by a tension spring 120, having one hooked end engaging an aperture 121 of the member 117 and having its opposite end hooked over a laterally extending finger 122 formed by serrating the forward edge of the test bail member 112, toward engagement with the bail portion 114 of the test bail member 112 but is limited in its range of movement toward the latter by a square-headed pin 123 secured to the permutation slide 17 and extending through a T-slot 124 of the member 117 as shown. The past-position identifying slide member 117 further includes a longitudinal slot 125 of rectangular configuration having reentrant end projections 126 and 127. As more clearly shown in the fragmentary elevational cross-sectional views of FIGS. 10 and 11, each permutation slide 17 is provided with a similar longitudinal elongated slot 128 also of rectangular configuration and likewise including reentrant end projections 129 and 130. When the square-head pin 123 occupies a position at the juncture of the arms and leg of the T-slot 124 of the member 117, the slot 125 of the member 117 coincides with the slot 128 of the associated permutation slide 17 so that the reentrant end projections 126 and 127 of the member 117 overlie the reentrant end projections 129 and 130 of the permutation slide 17. A helical compression spring 131, having its ends encircling the projections 126 and 129 on the one hand and the projections 127 and 130 on the other hand, biases the past-position identifying slide member 117 to a position on the associated permutation slide 17 such that the square-head pin 123 occupies a position at the juncture of the arms and leg of the T-slot 124. The compression spring 131 permits reciprocal motion of the member 117 on the slide 17 to position the square-head pin 123 in either arm of the T-slot 124, and also permits pivotal motion of the member 117 on the slide 17 to position the square-head pin 123 in the leg of the slot 124. As indicated in broken lines in FIG. 9 and by the fragmentary elevational cross-sectional view of FIG. 11, the apertures 125 and 128 of the member 117 and slide 17 are laterally offset in staggered relation with respect alternate ones of the permutation slides 17 laterally to offset the bias springs 131 of adjacent slides and thereby avoid possible engagement of the bias spring 131 of one slide with the bias spring 131 of an adjacent slide during longitudinal relative movement of the one and adjacent slides.

Each of the past-position identifying slide members 117 cooperates with the portion 114 of the test-bail member 112 to identify near the outset (specifically between approximately 80° and 100°) of each cycle of translator operation the position to which the associated permutation slide 17 had been set during the preceding cycle of the translator operation. Thus the particular function of the past-position identifying slide members 117 is to "remember" at the outset of each cycle of translator operation the permutational settings of associated ones of all of the permutational slides 17 during the preceding translator cycle. They accordingly enable a test for identity or lack of identity as between a present-cycle permutational setting of the permutational slides 17 and their settings in the preceding translator cycle. To this end, the seeker test bail 66 between about 200° to 240° of a cycle of translator operation, but before the permutation slides 17 have been moved to their reset position between approximately 310° and 350° of the translator cycle, withdraws the test-bail portion 114 of the test-bail member 112 to a position out of engagement with a projection 132 provided on the forward edge of each slide member 117. Each member 117 is thereby enabled to be moved under force of its associated compression spring 131 to a position on its associated permutation slide 17 at which the square-head pin 123 is positioned at the juncture of the arms and leg of the T-slot 124 of the member 117. Thereafter, the test bail 66 beginning at approximately 240° of the translator cycle permits the test-bail member 112 to move toward the permutation slides so that the test-bail portion 114 at approximately 268° of the translator cycle engages one side or the other of the projection 132 of the member 117. The permutation slides 17 are then reset in the manner previously explained to their latched or non-operated positions.

If a permutation slide 17 remained in its non-operated position during a given translator cycle, the test-bail portion 114 at the end of the cycle would engage the left-hand side of the projection 132 as seen in FIG. 9 so that the permutation slide and its associated past-position identifying slide member 117 would occupy the positions shown in FIG. 9. If on the other hand a permutation slide 17 had been unlatched to operated position during the translator cycle, the test-bail member 112 would have its portion 114 move into engagement with the right-hand side of the projection 132. In this instance, upon resetting the permutation slide to its reset or non-operated position near the end of the translator cycle the test-bail portion 114 would cause the member 117 to remain stationary and thus position the square-head pin 123 in the right-hand arm of the T-slot 124 at the completion of the cycle. Consider now the effect of differing permutational slide settings in two successive translator cycles and assume that in a new code translator cycle a permutation slide 17 is unlatched to operated position whereas it did not occupy such position in the preceding translator cycle. Under this assumption the cooperative relation between the test-bail portion 114 and the projection 132 of the member 117 of this permutation slide would retain the member 117 stationary and thus position the square-head pin 123 in the left-hand arm of the T-slot 124 upon movement of the permutation slide to operated position. Assume, conversely, that a permutation slide 17 is retained in latched or non-operated position in the current translator cycle whereas it had been unlatched to operated position during the preceding translator cycle. In this instance the cooperation between the test-bail portion 114 and the projection 132 of the member 117 would have positioned the square-head pin 123 in the right-hand arm of the slot 124 at the end of the preceding cycle where it would remain during the current translator cycle.

After each new setting of the permutation slides 17 during a translator cycle, the test bail 66 moves to permit the seeker structures 52 to move to test position as earlier described and in doing so permits the test bail member 112 to move under the force of its bias spring 113 into edge engagement with all of the past-position identifying slide members 117 associated with all of the permutation slides 17. The test-bail member 112 attempts at this time to pivot all of the past-position identifying slide members 117 about the pin 118, but cannot so pivot the members 117 unless all of them occupy a position on their associated permutation slides 17 such that the square-head pin 123 of all slides may enter the leg portion of the T-slot 124 of all of the members 117. This condition, however, identifies the permutational setting of the slide members 17 in the current translator cycle as being identical to their setting in the previous translator cycle and thus is an indication that the present permutational code repeats the permutational code of the previous translator cycle. If even one permutation slide 17 in its present permutational setting does not correspond to its setting in the previous translator cycle, the position of the square-head pin 123 in one or the other arms of the T-slot 124 of the member 117 associated with such slide will prevent pivotal motion of the members 117 by the test bail member 112 and thereby signify that the present permutational code is different from that of the preceding tanslator cycle. Whenever the test bail member 112 is able pivotally to move all of the past-motion identifying slide members 117, the lower end portion 112*a* of the test-bail member 112 pivots sufficiently far that it actuates an operating arm 135 (FIG. 12) of a microswitch 136 secured to the translator baseplate 20. This causes the microswitch to effect snap-action transfer of a movable contact from normal engagement with one stationary contact into engagement with another stationary contact for a control purpose presently to be described.

The foregoing described manner and effect of the setting of the past-position identifying slide members 117 on their associated permutation slides 17 during a translator cycle of operation may be more clearly preceived by consideration of FIGS. 13–16 which illustrate the sequence of setting operations in respect one permutation slide during each of four translator cycles involving repeat and non-repeat codes. FIG. 13 represents the setting sequence of operations for a new code requiring a change in the permutational positioning of a permutation slide 17 in the current translator cycle with respect its positioning in the preceding translator cycle. At the outset of the current translator cycle represented by FIG. 13A, it is assumed that the permutation slide 17 had not been set to its unlatched or operated position in the preceding translator cycle and accordingly that the test-bail portion 114 is positioned to the left of the projection 132 of the member 117 at the outset of the current translator cycle. FIG. 13B assumes that the permutation slide 17 is unlatched to its operated position in the current translator cycle, and accordingly that the slide moves to the left as indicated by the arrow 137 to position the square-head pin 123 in the left-hand arm of the T-slot 124 by reason of the fact that the engagement of the test-bail portion 114 with the projection 132 holds the member 117 stationary at this time. When the test-bail portion 114 is subsequently permitted to move to test position, it is unable to pivot the member 117 by reason of the positioning of the square-head pin 123 in the left-hand arm of the T-slot 124 at this time. FIG. 13C shows the subsequent retracted withdrawal of the test-bail portion 114 from engagement with the projection 132 to permit the member 117 to move longitudinally on the slide 17, as represented by the arrow 138. This movement occurs in the manner and by reason of the compressive force of the associated spring 131 as previously described, and positions the square-head pin 123 in the T-slot 124 as shown. FIG. 13D shows the return of the test-bail portion 114 into engageable relation with the projection 132 prior to reset of the permutation slide 17 to its non-operated position, and it will be noted that the test-bail portion 114 now engages the right-hand side of the projection 132. FIG. 13E illustrates the relative positioning of the slide 17 and member 117 after the slide 17 has been moved in the direction indicated by the arrow 139 to its reset or non-operated position, the member 117 being retained against movement at this time by engagement of the test-bail portion 114 with the projection 132. The square-head pin 123 is thereby positioned in the right-hand arm of the T-slot 124 at the completion of the translator cycle.

The sequence of setting operations illustrated in FIG. 14 assumes that during the translator cycle following that represented by FIG. 13 the permutation slide 17 is again unlatched to its operated position by the new permutation code. FIG. 14A illustrates the relative positioning of the slide 17 and the member 117 at the outset of this translator cycle, the relative positioning of these parts being the same as that shown in FIG. 13E at the conclusion of the preceding translator cycle. FIG. 14B illustrates the presently assumed setting of the permutation slide 17 to its unlatched or operated position, the slide moving in the direction indicated by the arrow 137'. During this setting of the slide, the member 117 is not maintained stationary by the cooperative relation of the test-bail portion 114 and projection 132, but rather is maintained stationary by reason of the force exerted by the compression spring 131 (FIG. 9) which as earlier mentioned tends to maintain the relative positions of the slide 17 and the member 117 with the square-head pin 123 positioned at the juncture of the arms and leg of the T-slot 124. This is the relative position of the slide 17 and member 117 after the slide has moved to unlatched or operated position, and now when the test-bail portion 114 moves to test position in the direction indicated by the arrow 140 it is able angularly to pivot the past-position identifying slide member 117 (as indicated in broken lines) since such pivotal motion is now permitted by reason of the fact that the square-head pin 123 may now enter the leg of the T-slot 124. This pivoting of the member 115 with resultant movement of the test-bail portion 114 fully to its test position (indicated in broken lines) thus signifies that the permutational positioning of the slide 17 during the current translator cycle is the same as its positioning during the preceding translator cycle. FIG. 14C illustrates the subsequent retraction of the test-bail portion 114 out of engagement with the projection 132 prior to restoration of the slide 17 to its reset or non-operated position, but there is now no relative motion between the slide 17 and member 117 since these members presently occupy the normal relative position to which they are urged by the compression spring 131 (FIG. 9). Thus the test-bail portion 114 returns to engagement with the right-hand side of the projection 132 as illustrated in FIG. 14D, and upon reset of the slide 17 in the direction indicated by the arrow 139' to its latched or non-operated position the slide 17 and member 117 occupy the same relative positions at the end of the translator cycle illustrated in FIG. 14E as they did at the outset of the translator cycle (FIG. 14A).

FIG. 15 illustrates the sequence of setting operations under the assumption that the permutation slide 17 is set by a new code to a different permutational position than it occupied in the preceding cycle discussed in relation to FIG. 14. The relative positions of the slide 17 and member 117 at the outset of this translator cycle represented by FIG. 15A is the same as that which they occupied at the completion of the preceding translator cycle represented by FIG. 14E. By reason of the assumed change of permutational setting of the slide 17 in the current translator cycle as compared to its setting in the preceding cycle during which the slide was set in the unlatched or operated position (FIG. 14B), there is no present relative motion between the slide 17 and member 117 during the translator setting of the permutation slides. Accordingly, the square-head pin 123 remains in the right-hand arm of the T-slot 124 as illustrated in FIG. 15B and prevents angular pivotal motion of the member 117 when the test-bail portion 114 moves toward test position in the direction indicated by the arrow 140'. The test-bail portion 114 is thereby restrained by the member 117 from moving fully to its test position, thus signifying that the permutational setting of the permutation slide 17 in the current translator cycle is different from the setting of this slide during the preceding translator cycle. FIG. 15C illustrates the subsequent withdrawal of the test-bail portion 114 out of engagement with the projection 132 to permit the member 117 to move, as indicated by the arrow 138', under force of the compression spring 131 (FIG. 9) to its normal position on the slide 17 at which the square-head pin 123 is positioned at the juncture of the arms and leg of the T-slot 124. Upon subsequent return of the test-bail portion 114 into engaging relation with the projection 132 as illustrated in FIG. 15D, the test-bail portion 114 now engages the left-hand edge of the projection 132 and the slide 17 and member 117 remain in this relative position at the conclusion of the translator cycle represented by FIG. 15E.

FIG. 16 shows the sequence of setting operations for the assumption that the permutational setting of the permutation slide 17 in the next translator cycle is the same as its setting in the preceding translator cycle represented by the sequential operations described in connection with FIG. 15. FIG. 16A represents the relative positions of the slide 17 and member 117 at the outset of the new translator cycle, these members occupying the same position as at the end of the preceding translator cycle represented by FIG. 15E. Since under the assumed condition the translator slide 17 remains in its latched or non-operated condition during this new translator cycle (it remained in non-operated position during the preceding translator cycle as described in connection with FIG. 15B), the test-bail portion 114 upon subsequent movement in the direction indicated by the arrow 140'' of FIG. 16B may now move fully to test position (indicated in broken lines) by reason of the fact that the square-head pin 123 is positioned to enter the leg of the T-slot 124 and thus permit the test-bail portion 114 to pivot the member 117 as indicated in broken lines. As before, the test-bail portion 114 in moving fully to test position signifies that the current setting of the permutation slide 17 is the same as its setting in the preceding translator cycle. Upon retraction of the test-bail portion 114 out of engagement with the projection 132 as illustrated in FIG. 16C, the permutation slide 17 and member 117 occupy their normal position established by the compression spring 131 (FIG. 9) so that there is no relative movement of the member 117 on the slide 17. Now when the test-bail portion 114 returns to engaging relation with the projection 132 as illustrated in FIG. 16D, the portion 114 again engages the left-hand edge of the projection 132 as illustrated in FIG. 16D and this is the relative position of these component parts at the conlusion of the translator cycle represented by FIG. 16E.

FIG. 17 is an electrical circuit diagram showing a representative control circuit to accomplish the previously mentioned intercontrol between the cyclic operations of the code translator described herein and a data source here assumed by way of example to be comprised by a tabulating card reader. A typical such reader is disclosed in the U.S. Patent No. 3,227,860, granted Jan. 4, 1966, to Edwin O. Blodgett, which operates to read a 12-bit Hollerith code conventionally employed to record data information in standard tabulating cards. The tabulating card reader is shown as being placed into operation by manual operation of a start switch 141 to close its contacts and energize a reader control relay RCR. The contacts 1 and 2 of the latter relay thereupon close to energize the clutch magnet LRC (the magnet 92 of the last mentioned Blodgett patent) through normally closed contacts of code translator cam actuated contacts STC1 and the normally closed contacts 1 and 2 of a delay control relay DCR. This energization of the reader clutch magnet LRC initiates a cycle of reader operation during which the reader code reading contacts RC1–RC12 are operated to closed contact position singly or in permutational combinations according to a permutational code read during this reader cycle from an index-point column representing a coded information item recorded in the tabulating card. The operated one or ones of the reader contacts RC1–RC12 energize one or a permutational combination of the translator code magnets 41 to release to unlatched or operated positions one or a permutational combination of the translator permutation slides 17. After the permutation slides 17 have thus been set, reader cam-actuated common contacts RCC close to energize the translator clutch magnet 16 through a diode rectifier 142 and thereby initiate a cycle of code translator operation.

The reader common contacts RCC are only briefly closed so that, as explained above, the translator clutch may halt the translator at 140° of the translator cycle. This translator cyclic position occurs after transfer of the contacts of the microswitch 136 (FIGS. 8 and 12) at about 100° of the translator cycle should the microswitch be operated by the test-bail member 112 by reason of the fact that the permutational slide setting in response to the present permutational code supplied by the reader is identical to the permutational slide setting of the preceding translator cycle of operation. Assuming for the moment that the permutational slide setting of the present translator cycle is different from that of the preceding translator cycle so that the microswitch 136 is not operated, the translator is released without delay past its 140° cyclic position by energization of the clutch magnet 16 through the normally closed contacts 1 and 2 of the microswitch 136 and the contacts 1 and 2 of the translator cam-actuated contacts STC2 which close at 100° of the translator cycle. At the same time, energization is concurrently supplied from the energizing circuit last mentioned through a diode rectifier 144 and the normally closed contacts 1 and 3 of a relay RE to the delay control relay DCR to energize the latter and thereby open its contacts 1 and 2. This interrupts the energizing circuit of the reader clutch magnet LRC until the delay control relay DCR becomes deenergized when the contacts 1 and 2 of the translator cam-actuated contacts STC2 open at 250° of the translator cycle. Under the assumed condition mentioned just above, the reader clutch magnet LRC is again energized to initiate a further cycle of reader operation when the contacts 2 and 3 of the translator cam-actuated contacts STC2 again close at 250° of the translator cycle and the contacts 1 and 2 of the relay DCR again close.

Assume now that the permutation code read by the reader during the second reader cycle is identical to the permutation code read during the preceding reader cycle so that the same reader contacts RC1–RC12 are again operated to energize the same code electromagnets 41 and thus set the permutation slides in the second translator cycle (initiated when the reader common contacts RCC again close to energize the translator clutch magnet 16) to the same setting as in the preceding translator cycle. Under this assumed condition, the microswitch 136 is operated to open its contacts 1 and 2 while closing its contacts 2 and 3 at 100° of the translator cycle when the test-bail member 112 operates fully to test position as above described and by reason of the identity of setting of the permutational slides during the present and preceding translator cycle. This operating position of the microswitch 136 interrupts at its contacts 1 and 2 the normal energization of the translator clutch magnet 16 when the translator cam-actuated contacts STC2 transfer at 100° of the translator cycle, and a relay RE is now energized through normally closed contacts 3 and 4 of the relay DCR when the contacts 1 and 2 of the translator cam-actuated contacts STC2 close at 100° of the translator cycle. The now closed contacts 1 and 2 of the relay RE energize the delay control relay DCR, which thereupon opens its contacts 3 and 4 to interrupt the energizing circuit of the relay RE and closes its contacts 3 and 5 to maintain the relay DCR energized from the energizing circuit of the relay RE after the latter becomes fully deenergized upon expiration of a 10 millisecond delay interval established by the time required to discharge a condenser 143 connected in shunt to the winding of the relay RE. The now open contacts 1 and 2 of the delay control relay DCR interrupt the energizing circuit of the reader clutch magnet LRC so that no new cycle of reader operation can be initiated until the translator has been released past its 140° cyclic halt position and reaches its 180° cyclic position to reclose the contacts of the translator cam-actuated contacts STC1. This release of the translator past its 140° halt position occurs after an approximate 25 to 30 millisecond delay interval comprised by the 10 millisecond interval required for the relay RE to become fully deenergized and an additional 15 to 20 millisecond interval required for its contacts 1 and 3 to reclose and thereby energize the translator clutch magnet 16 through the diode rectifier 144, the now closed contacts 1 and 3 of the relay RE, the now closed contacts 3 and 5 of the delay control relay DCR, the now closed contacts 2 and 3 of the microswitch 136 which remain closed to 215° of the translator cycle, and the now closed contacts 1 and 2 of the translator cam-actuated contacts STC2 which remain closed until 250° of the translator cycle. Energization of the translator clutch magnet 16 thus releases the translator past its 140° cyclic position after expiration of the 25 to 30 millisecond delay mentioned, and the delay control relay DCR is deenergized when the contacts 1 and 2 of the translator cam-actuated contacts STC2 again open at 250° of the translator cycle (the snap action of the microswitch 136 rapidly to close its contacts 1 and 2 meanwhile maintaining the relay DCR energized through the now closed contacts 1 and 3 of the relay RE, the diode rectifier 144, the now closed contacts 1 and 2 of the microswitch 136, and the closed contacts 1 and 2 of the cam-actuated contacts STC2). Upon deenergization of the delay control relay DCR, its contacts 1 and 2 close to energize the reader clutch magnet LRC and thus initiate a further cycle of reader operation.

It will be apparent from the foregoing description of the invention that a repeat-character-delay code translator embodying the invention has particular utility for incorporation into power-driven typewriters for automatic print-reproduction control thereof and is one which enables a desirably higher than normal typewriter print-reproduction rate with automatic reduction of the print-reproduction rate to normal upon print reproduction of any two or more repetitive alpha-numeric or symbol character. A translator embodying the invention has the advantages of a sturdy construction providing highly reliable and error-free operation over prolonged operational periods and is one requiring minimized service attention and maintenance.

While there has been described a specific form of the invention for purposes of illustration, it is contemplated that numerous changes may be made without departing from the spirit of the invention.

I claim:

1. A repeat-character-delay code translator comprising, a code translator structure having plural reciprocal code permutation members and including operating means for successively and selectively positioning said members individually in one of two operative positions thereof according to corresponding individual ones of the code elements in each of successive multiple-code-element permutation codes supplied for control of said operating means and having plural seeker members selected individually according to each individually different permutational positioning of said permutation members in said two operative positions thereof, seeker operating means for moving each said selected seeker to a seeker output-actuation position, a repeat character delay test member reciprocally moved toward and from a test position under control of said permutation-member operating means after each said permutational positioning of said permutation members, means carried by each said permutation member and cooperating with said test member for controlling the motion of said test member to either of two test positions according to the repeat-character identity or lack of identity of the successive permutational positioning of said permutation members in accordance with succesive supplied permutation codes, and means controlled by said test member in the one of said two positions thereof corresponding to said repeat-character identity to delay for a preselected time interval said movement of the selected one of said seeker members to said seeker output-actuation position.

2. A repeat-character-delay code translator according to claim 1 wherein said test member position control means is comprised by a past-position identifying member carried by each said permutation member and cooperating with said test member to identify the previous permutation code positioning of said each permutation member in either of two positions thereof and in conformity with such identification to effect said controlled positioning of said test member.

3. A repeat-character-delay code translator according to claim 2 wherein each said identifying member is reciprocally and pivotally supported on the associated permutation member, wherein said each identifying member is maintained stationary by the cooperative relation thereof to said test member during the permutational code positioning of the associated permutation member by said permutation-member operating means prior to movement of said test member toward said test position thereof, and wherein each said identifying member may be moved by said test member to pivot on the associated permutation member whenever the immediately previous permutation code position of said associated permutation member corresponds to the position thereof at the time of movement of said test member toward said test position thereof.

4. A repeat-character-delay code translator according to claim 3 wherein each said identifying member is spring biased toward a position identifying the current position of the associated permutation member at the time of movement of said test member toward said test position thereof, and wherein said test member moves away from said test position thereof to a retracted position permitting all of said identifying members to move under bias of their associated springs to said current identifying position and thereafter returns to a position cooperating with said identifying members.

5. A repeat-character-delay system according to claim 4 wherein each said identifying member is comprised by an elongated slide member having a longitudinal slot at one end and is reciprocally and pivotally supported on the side of the associated permutation member by a first pin extending through said slot and secured to the side of the associated permutation member, and wherein the opposite end of each said slide member is provided with a T-slot having longitudinally extending arms and a transversely extending leg and which is engaged by a second pin positioned in said T-slot and secured to the side of the associated permutation member.

6. A repeat-character-delay code translator according to claim 4 wherein each said identifying slide and its associated permutation member having mating longitudinal slots in said current relative positioning thereof and said spring is comprised by a helical compression spring fixedly positioned in said last-mentioned slots to permit pivotal motion of each said identifying slide member on its associated permutation member and to permit longitudinal motion of said identifying slide member in each of two directions on its associated permutation member, said spring tending to bias said each identifying slide member to a longitudinal position on its associated slide member at which said second pin is positioned at the juncture of the arms and leg of said T-slot.

7. A repeat-character-delay code translator according to claim 5 wherein each said identifying member is spring biased toward said test member but is limited in its pivotal motion toward said test member by engagement of said second pin with said T-slot.

8. A repeat-character-delay code translator according to claim 5 wherein each said identifying slide member has an edge projection which in the cooperative relation of said identifying slide member with said test member is engaged by said test member to maintain each said identifying slide member stationary during permutational code positioning of the associated permutation member by said permutation-member operating means.

9. A repeat-character-delay code translator according to claim 4 wherein said test member is comprised by a pivoted test lever extending transversely across all of said identifying members and is permitted to move to said one test position thereof when all of said identifying members occupy said current identifying position on their associated permutation members after positioning of said permutation members by said permutation-member positioning means.

10. A repeat-character-delay code translator comprising:

a code translator structure having plural stacked, elongated, and longitudinally reciprocal code permutation members normally spring-biased toward a first unlatched position;

means including code translating magnets for normally latching said permutation members in a second latched position thereof but responsive to individual ones of electrical code signals concurrently applied to said electromagnets as representative of a permutation code for selectively unlatching corresponding ones of said permutation members to said one position thereof;

translator cycle operating means including a power driven partial-revolution clutch haltable at cyclic home and intermediate positions until released from each of said positions by an electrical pulse signal applied briefly to energize a clutch control magnet, said clutch control magnet being energized by a brief electrical pulse signal applied essentially concurrently with the code-signal energization of said code electromagnets, thereby to initiate a translator cycle of operation;

means controlled by said operating means near completion of each said translator cycle for restoring any unlatched one of said permutation members to said second latched position thereof;

plural seeker members controlled by said operating means for movement toward a seeker selection position subsequent to release of said clutch past said partial-revolution position thereof, and individual one of said seeker members being permitted to attain said seeker selective position according to each individually different permutational positioning of said permutation members in said one and second positions thereof;

means controlled by said operating means for moving each said selected seeker to a seeker-output-actuation position;

a repeat-character-delay test member and means controlled by said operating means for reciprocally moving said test member toward and from a test position after each said permutational positioning of said permutation members;

means carried by each said permutation member and cooperating with said test member for controlling the motion of said test member to either of two test positions according to the repeat-character identity or lack of identity of the successive permutational positioning of said permutation members in accordance with successive permutational groups of electrical signals applied to said code electromagnets;

and means controlled by said test member in the one of said two positions thereof corresponding to said repeat-character identity for delaying the electrical energization of said clutch magnet at said partial-revolution position of said clutch to delay for a preselected interval the movement of the selected one of said seeker members to said seeker output-actuation position thereof.

11. A repeat-character-delay code translator according to claim 10 wherein said test member cooperating means is comprised by a past-position identifying slide member reciprocally and pivotally supported on each of said permutation members, wherein each said identifying slide members is maintained stationary by the cooperative relation thereof to said test member during permutational code positioning of the associated permutation member in said latched and unlatched positions thereof, and wherein each said identifying slide member may be moved by said test member to pivot on its associated permutation member whenever the position of the associated permutation member during the preceding translator operating cycle corresponds to the position thereof in the succeeding translator cycle and at the time of movement of said test member toward said test position thereof.

12. A repeat-character-delay code translator according to claim 11 wherein each said identifying slide member is spring biased toward a position on its associated permutation member identifying the current latched or unlatched position of the associated permutation member during each translator cycle, and wherein said test member moves from said test position after each said permutational positioning of said permutation members to permit all of said identifying slide members to move to said current identifying position on their associated permutation members after which said test member returns to a position cooperating with said identifying slide members.

13. A repeat-character-delay code translator according to claim 12, in which each said identifying slide member has an edge projection which in the cooperative relation of said identifying slide member with said test member is engaged by said test member to maintain each slide member stationary during movable positioning in each translator cycle of the associated permutation member to a latched or unlatched position differing from the positioning of the associated permutation member during the preceding translator cycle.

14. A repeat-character-delay code translator according to claim 13 wherein said test member is comprised by a pivoted test lever extending across all of said identifying slide members and is permitted pivotally to move to said one test position thereof when all of said identifying slide members occupy said current identifying positions on their associated permutation members.

References Cited

UNITED STATES PATENTS

| | | | |
|---|---|---|---|
| 2,700,446 | 1/1955 | Blodgett | 197—20 |
| 2,869,717 | 1/1955 | Rosstho et al. | 199—18 |
| 2,873,837 | 2/1959 | Clark | 197—20 |
| 2,995,231 | 8/1961 | VonKummer et al. | 197—20 |
| 3,269,509 | 8/1966 | Smith | 197—19 |

ROBERT E. PULFREY, *Primary Examiner.*

WILLIAM B. PENN, *Examiner.*

E. S. BURR, *Assistant Examiner.*